United States Patent
Kasazumi et al.

(10) Patent No.: US 10,182,221 B2
(45) Date of Patent: Jan. 15, 2019

(54) DISPLAY DEVICE AND DISPLAY METHOD

(71) Applicant: Panasonic Intellectual Property Management Co., Ltd., Osaka (JP)

(72) Inventors: Kenichi Kasazumi, Osaka (JP); Toshiya Mori, Osaka (JP)

(73) Assignee: PANASONIC INTELLECTUAL PROPERTY MANAGEMENT CO., LTD, Osaka (JP)

(*) Notice: Subject to any disclaimer, the term of this patent is extended or adjusted under 35 U.S.C. 154(b) by 116 days.

(21) Appl. No.: 15/308,354

(22) PCT Filed: May 8, 2015

(86) PCT No.: PCT/JP2015/002339
§ 371 (c)(1),
(2) Date: Nov. 1, 2016

(87) PCT Pub. No.: WO2015/174052
PCT Pub. Date: Nov. 19, 2015

(65) Prior Publication Data
US 2017/0054963 A1    Feb. 23, 2017

(30) Foreign Application Priority Data
May 12, 2014   (JP) ................. 2014-098812

(51) Int. Cl.
*H04N 13/128*   (2018.01)
*H04N 13/302*   (2018.01)
(Continued)

(52) U.S. Cl.
CPC .......... *H04N 13/128* (2018.05); *B60K 35/00* (2013.01); *B60R 1/00* (2013.01); *G02B 27/0025* (2013.01);
(Continued)

(58) Field of Classification Search
CPC .................................................. H04N 13/128
See application file for complete search history.

(56) References Cited

U.S. PATENT DOCUMENTS

2010/0157430 A1   6/2010   Hotta et al.
2011/0187844 A1   8/2011   Ogawa et al.

FOREIGN PATENT DOCUMENTS

DE   102009043351      *  4/2011
DE   102009043351 A1  *  4/2011   ............. G02B 27/01
(Continued)

OTHER PUBLICATIONS

International Search Report of PCT application No. PCT/JP2015/002339 dated Aug. 4, 2015.
(Continued)

*Primary Examiner* — James M Pontius
(74) *Attorney, Agent, or Firm* — Greenblum & Bernstein, P.L.C.

(57) ABSTRACT

This display device is provided with a display unit and a connection unit. The display unit reflects a naked-eye-stereoscopic display image onto a glass windshield. The correction unit corrects, in accordance with correction patterns corresponding to the curved shape of the glass windshield, the image to be displayed includes a left-eye image and a right-eye image. The image to be displayed includes a left-eye image and a right-eye image. The correction patterns include: a first pattern for correcting the left-eye image: and a second pattern for correcting the right-eye image.

7 Claims, 7 Drawing Sheets

(51) Int. Cl.
| | |
|---|---|
| *H04N 13/383* | (2018.01) |
| *B60K 35/00* | (2006.01) |
| *G02B 27/01* | (2006.01) |
| *G02B 27/22* | (2018.01) |
| *G09G 3/20* | (2006.01) |
| *G09G 5/36* | (2006.01) |
| *H04N 13/00* | (2018.01) |
| *B60R 1/00* | (2006.01) |
| *G02B 27/00* | (2006.01) |
| *H04N 13/30* | (2018.01) |

(52) U.S. Cl.
CPC ............ *G02B 27/01* (2013.01); *G02B 27/22* (2013.01); *G09G 3/20* (2013.01); *G09G 5/36* (2013.01); *H04N 13/00* (2013.01); *H04N 13/30* (2018.05); *H04N 13/302* (2018.05); *H04N 13/383* (2018.05); *B60K 2350/1008* (2013.01); *B60K 2350/2052* (2013.01); *B60K 2350/352* (2013.01); *B60R 2300/205* (2013.01); *B60R 2300/8006* (2013.01); *G02B 27/0093* (2013.01); *G02B 27/0101* (2013.01); *G02B 27/0179* (2013.01); *G02B 2027/011* (2013.01); *G02B 2027/014* (2013.01); *G02B 2027/0134* (2013.01); *G02B 2027/0138* (2013.01); *G02B 2027/0187* (2013.01)

(56) References Cited

FOREIGN PATENT DOCUMENTS

| | | |
|---|---|---|
| DE | 102009043351 A1 | 4/2011 |
| JP | 8-095481 A | 4/1996 |
| JP | 2004-101829 | 4/2004 |
| JP | 2008-236550 | 10/2008 |
| JP | 2008-311977 | 12/2008 |
| JP | 2009-008722 | 1/2009 |
| JP | 2009-237088 | 10/2009 |
| JP | 2011-064760 | 3/2011 |
| JP | 2011-073496 | 4/2011 |

OTHER PUBLICATIONS

The Extended European Search Report dated Apr. 13, 2017 for the related European Patent Application No. 15793174.2.

\* cited by examiner

DISPLAY DEVICE AND DISPLAY METHOD

CROSS-REFERENCE TO RELATED APPLICATIONS

This application is a U.S. national stage application of the PCT International Application No. PCT/JP2015/002339 filed on May 8, 2015, which claims the benefit of foreign priority of Japanese patent application No. 2014-098812 filed on May 12, 2014, the contents all of which are incorporated herein by reference.

FIELD OF THE INVENTION

The present disclosure relates to a display device, and in particular, a display device for vehicle, and a display method.

DESCRIPTION OF THE RELATED ART

As a display device for a vehicle, a head-up display (HUD) is known. For example, meters for indicating a state of a vehicle, an arrow for navigating the vehicle, or the like is displayed in the head-up display.

For example, PTL 1 discloses a head-up display in which a distortion of a virtual image which is imaged in front of a windshield glass is suppressed by elaborating a shape of a reflective surface of a concave mirror.

In addition, PTL 2 discloses a three-dimensional head-up display device for performing a visual navigation matching a three-dimensional position of a land mark without shifting of focusing of eyes of an operator.

PTL 3 discloses an on-vehicle three-dimensional display device in which a mirror rotation angle is controlled by detecting a viewpoint position in order not to spoil the three-dimensional sense due to mounting error of the vehicle.

CITATION LIST

Patent Literature

PTL 1: Japanese Patent Unexamined Publication No. 2004-101829
PTL 2: Japanese Patent Unexamined Publication No. 2009-8722
PTL 3: Japanese Patent Unexamined Publication No. 2011-73496

SUMMARY OF THE INVENTION

The non-limiting and exemplary embodiments provide a display device, a display method, and a program for reducing a distortion due to a windshield glass in an image to be recognized by a user.

A display device according to an aspect of the present disclosure includes a display and a corrector. The display reflects a display image for a naked eye three-dimensional display to a windshield glass. The corrector corrects an image to be displayed on the display according to a correction pattern in accordance with a curved shape of the windshield glass. The image to be displayed includes an image for a left eye and an image for a right eye, and the correction pattern includes a first pattern for correcting the image for a left eye and a second pattern for correcting the image for a right eye, respectively.

It is to be noted that these generic or specific aspects may be implemented using a system, a method, an integrated circuit, a computer program, or a non-transitory computer-readable recording medium such as a CD-ROM, and may also be implemented by any combination of systems, methods, integrated circuits, computer programs, or recording media.

A further benefit and advantage of the disclosed embodiments provided will become apparent from the specification and drawings. There is a case where these benefits and advantages may be provided individually by various embodiments and the characteristic of the specification and drawings, and it is not required to provide necessarily all to obtain one or more benefits and advantages.

According to the display device, the display method, and the program according to the present disclosure, the deterioration of an image due to the partially distortion of the image can be reduced.

DETAILED DESCRIPTION OF THE PREFERRED EMBODIMENTS

Prior to description of an embodiment of the present disclosure, problems in a conventional display device are described. That is, in the display device for making a user recognize a display image by reflecting the display image to a front glass of (windshield glass) a vehicle, image to be recognized by the user is distorted by a curved surface of the windshield glass.

That is, in a case where the display image for a naked eye three-dimensional display is reflected to a windshield glass, since the positions of a left eye and a right eye of the user are different to each other, the distortion types of the image of the left eye and the right eye are different to each other. Therefore, in an image portion having a great distortion, the image portion is partially sensed as double images without fusing the image for the left eye and the image for the right eye.

By the seating height position of the user, in a case where the position of the display for a naked eye three-dimensional display or an arrangement angle is changed, a position where light of a display image emitted from the display device is reflected in a windshield glass is changed. Even in this case, a pattern of the image distortion to be generated in the display image is changed and the normal naked eye three-dimensional display cannot be performed.

Hereinafter, the embodiment will be described in detail while referring to drawings.

It is to be noted that each of the embodiments described below shows a generic or a specific example of the present disclosure. The numerical values, shapes, materials, structural elements, the disposition and connection form of the structural elements, steps, the processing order of the steps or the like, shown in the following embodiments are mere examples and do not restrict the scope of the claims. Furthermore, among the structural elements in the following embodiments, structural elements not recited in the independent claims each indicating the top concept are described as arbitrary structural elements.

(Embodiment 1)

[Configuration of Display Device]

Figure 1A:
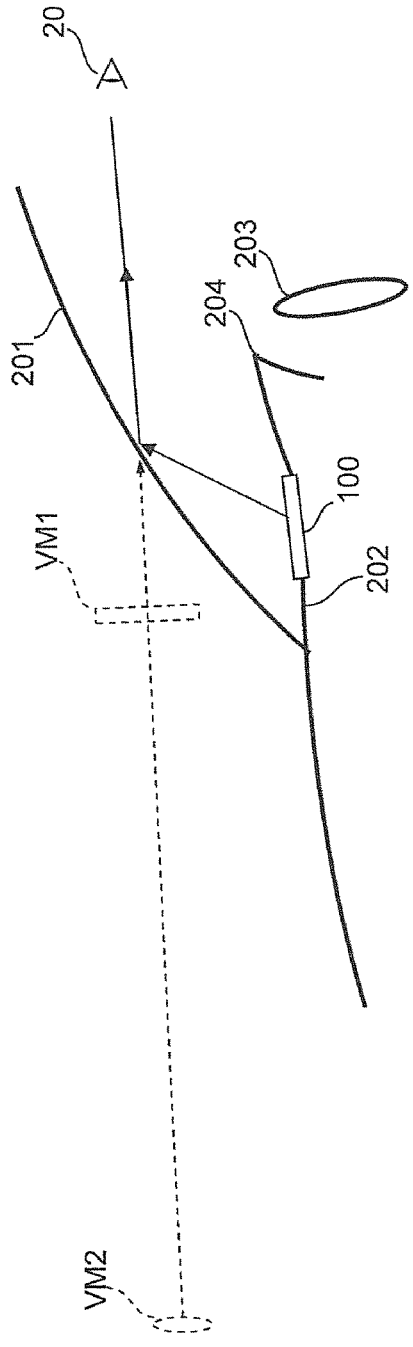
FIG. 1A is a schematic side view illustrating an on-vehicle example of a display device in Embodiment 1.

FIG. 1A is a schematic side view illustrating an on-vehicle example of a display device in Embodiment 1. FIG. 1A is a schematic diagram illustrating a partial side surface cross-section surface of a vehicle including windshield glass 201, dash board 202, panel cover 204, and handle 203. In addition, FIG. 1B is a schematic top view illustrating the on-vehicle example illustrated in FIG. 1A.

Figure 1B:
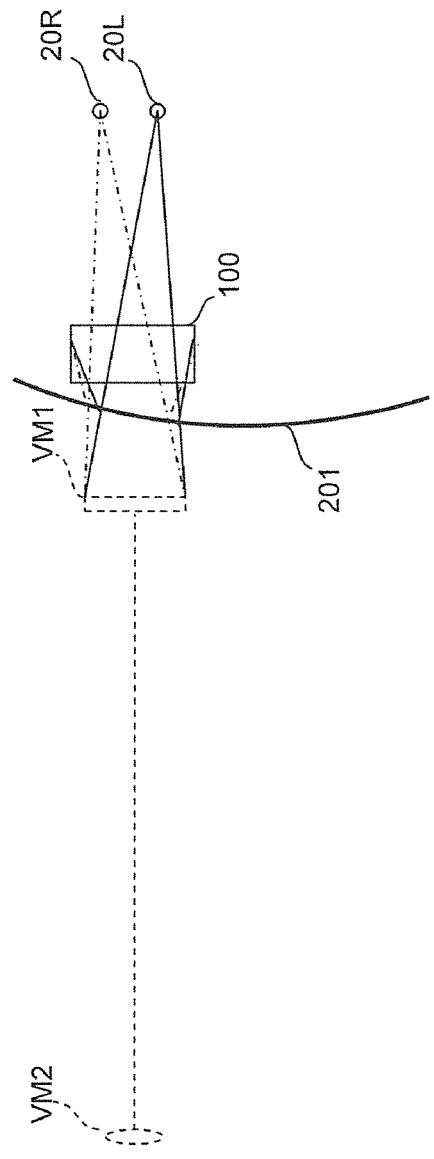
FIG. 1B is a schematic top view illustrating the on-vehicle example illustrated in FIG. 1A.

In FIGS. 1A and 1B, display device 100 is displaced on a top surface of dash board 202 with the display surface toward the windshield glass. The display image of display device 100 is reflected to a surface of windshield glass 201 and is viewed on eyes 20 of the user (left eye 20L and right eye 20R).

In a case where display device 100 displays a two-dimensional image, the display image is viewed as virtual image VM1 of an outside of the windshield glass by the user. In addition, in a case where display device 100 displays a three-dimensional naked eye three-dimensional display image, the display image is viewed as virtual image VM2 of an outside of the windshield glass by the user. A distance between virtual image VM2 and the user can be arbitrarily set.

Figure 2:
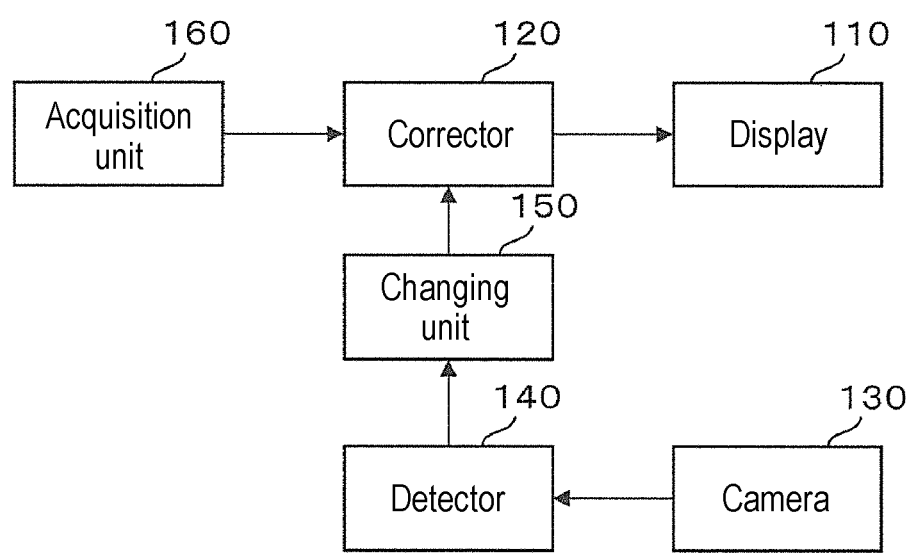
FIG. 2 is a block diagram illustrating a functional configuration example of the display device in Embodiment 1.

FIG. 2 is a block diagram illustrating a functional configuration example of display device 100 in Embodiment 1. As illustrated in FIG. 2, display device 100 includes display 110, corrector 120, camera 130, detector 140, changing unit 150, and acquisition unit 160.

Display 110 reflects the display image for a naked eye three-dimensional display to a surface of windshield glass 201. Display 110 includes, for example, a naked eye three-dimensional displayable planar display screen by a parallax barrier system or a lenticular lens system. Display 110 includes a liquid crystal display panel, an organic EL display panel. The image displayed by display 110 includes an image for a left eye and an image for a right eye and for example, a pixel row of the image for a left eye and a pixel row of the image for a right eye are alternately disposed in a strip shape in a k (k is an integer of 1 or more) pixel row unit according to the disposing of the parallax barrier and the lenticular lens.

Corrector 120 corrects an image to be displayed on display 110 according to a correction pattern in accordance with a curved shape of windshield glass 201. The image to be displayed includes the image for the left eye and the image for the right eye. The correction pattern shows a shape of the image for cancelling an image distortion due to a curved shape of windshield glass 201. The correction pattern includes a first pattern for correcting the image for the left eye and a second pattern for correcting the image for the right eye.

Camera 130 is provided in a front of the user in the vehicle and images the user.

Detector 140 detects the position of the left eye and the position of the right eye of the user from the image imaged by camera 130. For example, detector 140 detects the position of the left eye and the position of the right eye of the user for each frame obtained by the video imaging of camera 130.

Changing unit 150 changes the correction patterns (that is, a first pattern and a second pattern) according to the position of the left eye and the position of the right eye which are detected by detector 140. Specifically, in a case where the position of the left eye or the position of the right eye which is detected by detector 140 is changed, changing unit 150 changes the correction pattern.

Acquisition unit 160 acquires an image to be displayed (the above-described image for a left eye and the image for a right eye) in display 110 from a car navigation device or a tablet-type information terminal device such as a smartphone. For acquiring information of acquisition unit 160, a communication interface such as a wired or a wireless communication interface may be used.

(Detailed Configuration of Corrector 120)

Figure 3:
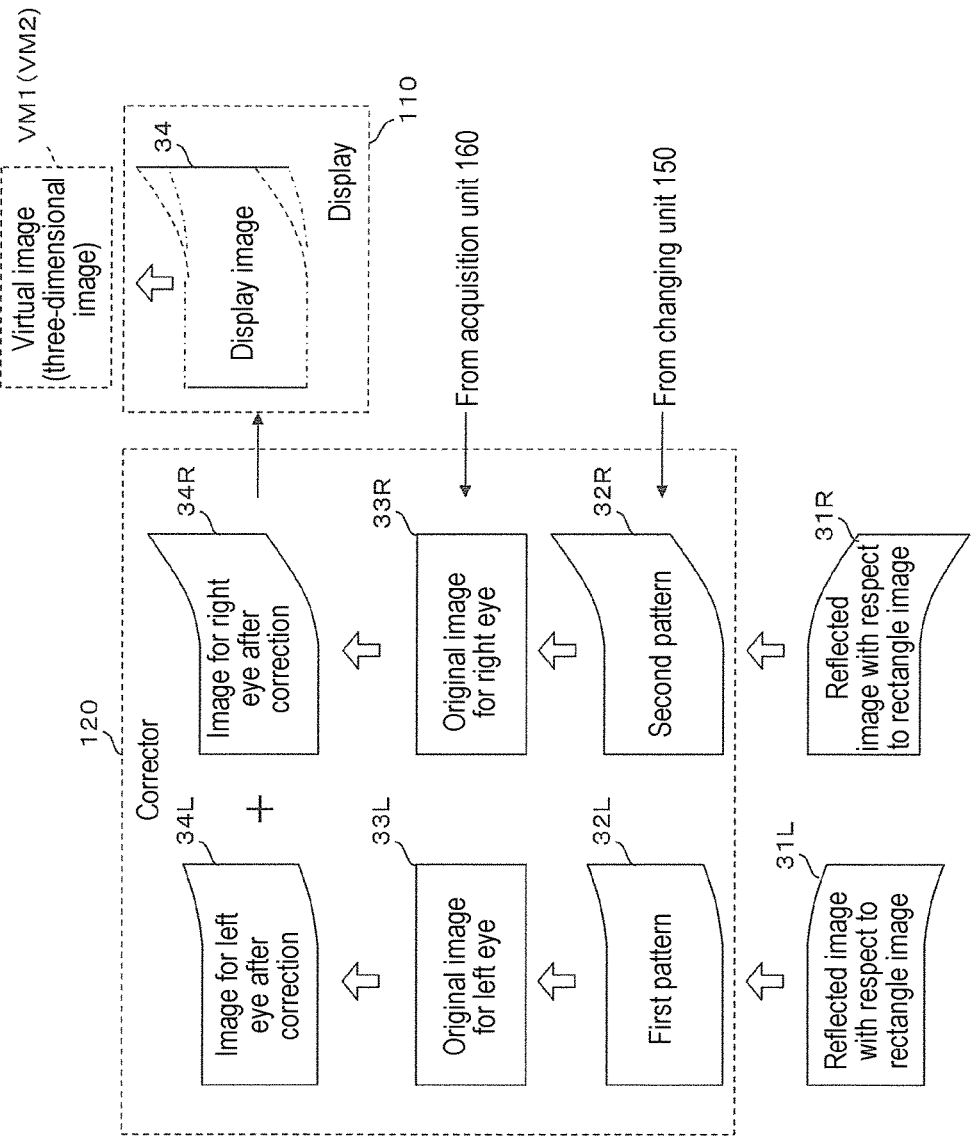
FIG. 3 is an operation explanatory diagram of a corrector and a display in Embodiment 1.

Next, the correction detail by corrector 120 will be described. FIG. 3 is an operation explanatory diagram of corrector 120 and display 110 in Embodiment 1.

In a case where display 110 reflects a rectangle display image to windshield glass 201, reflected image 31L to a rectangular image in FIG. 3 shows a shape of a reflected image viewed on the left eye. Reflected image 31R to the rectangular image shows a shape of the reflected image viewed on the right eye in the same case.

In reflected images 31L and 31R, a viewed position and a distorted shape are viewed different to each other. In the vehicle of a right handle as illustrated in FIG. 1B, it is assumed that a curve of a right end of windshield glass 201 is larger. In a case of a left handle, shapes of the left and right of reflected images 31L and 31R is inverted. In addition, the shapes of reflected images 31L and 31R are different by the positions of the left eye and the right eye. This is because the curved shape of windshield glass 201 is not uniform.

First pattern 32L has a shape which is obtained by vertically inverting a shape of reflected image 31L. Second pattern 32R also has a shape which is obtained by vertically inverting a shape of reflected image 31R. First pattern 32L and second pattern 32R are dynamically supplied from changing unit 150 to corrector 120.

Corrector 120 corrects original image for left eye 33L and original image for right eye 33R to be input from acquisition unit 160. That is, corrector 120 creates image for left eye 34L after correcting by converting a shape of original image for left eye 33L which has originally a rectangle shape to a shape of first pattern 32L. In the same manner, corrector 120 creates Image for right eye 34R after correcting by converting a shape of original image for right eye 33R which has originally a rectangle shape to a shape of second pattern 32R.

In addition, corrector 120 creates display image 34 by disposing image for left eye 34L after correcting and image for right eye 34R after correcting alternately in a strip shape in a k (k is an integer of 1 or more) pixel row unit according to the disposing of the parallax barrier or the lenticular lens of display 110. Created display image 34 is displayed on display 110 and reflected on a surface of windshield glass 201. Even when display image 34 is distorted by the reflection, the shape of display image 34 as display image 34 of FIG. 3 can cancel the distortion due to windshield glass 201. As a result, virtual image VM1 or virtual image VM2 viewed by the user becomes a rectangular shape.

[Detailed Configuration of Changing Unit 150]

Figure 4:
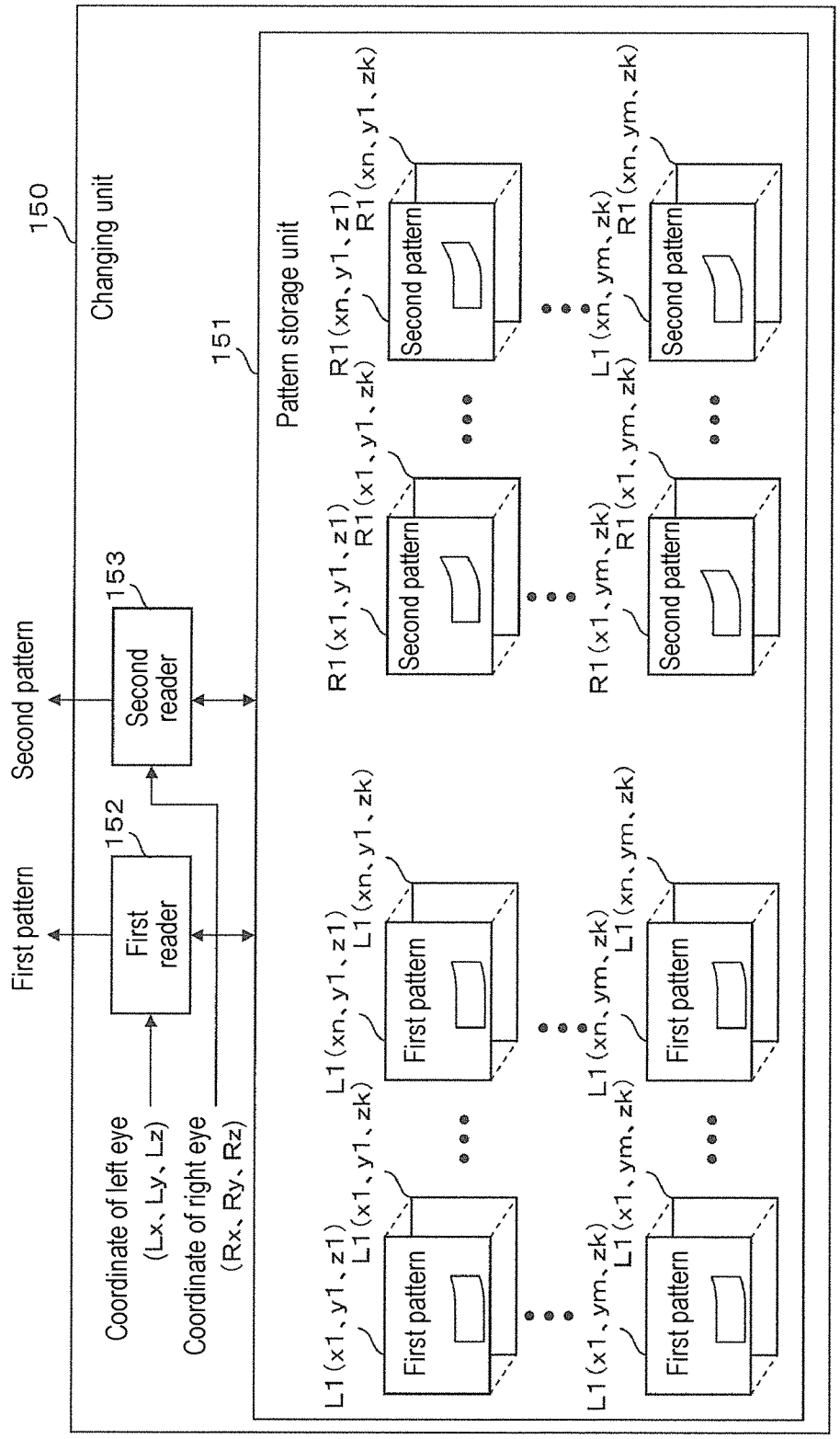
FIG. 4 is a block diagram illustrating a detailed configuration example of a changing unit in Embodiment 1.

Next, the detailed configuration example of changing unit 150 will be described. FIG. 4 is a block diagram illustrating a detailed configuration example of changing unit 150 in Embodiment 1. Changing unit 150 includes pattern storage unit 151, first reader 152, and second reader 153.

Pattern storage unit 151 stores a plurality of first patterns 32L (L1 in FIG. 4) and a plurality of second pattern 32R (R1 in FIG. 4) which are created in advance according to the curved shape of windshield glass 201 for each of the plurality of positions to be obtained by the left eye and the right eye. (x1, y1, z1) to (xn, ym, zk) in drawings shows a plurality of positional coordinates to be obtained by the left eye and the right eye of the xyz coordinate system in the vehicle. For example, x represents a position in a horizontal direction that is a coordinate in a parallel horizontal direction when regarding windshield glass 201 as a plane surface. y represents a position in a vertical direction that is a coordinate in a vertical direction. z represents a position of a longitudinal direction that is a coordinate in a horizontal direction orthogonal to an x-axis. That is, as a plurality of positional coordinates to be obtained by the left eye and the right eye, n sample points in a horizontal direction, m sample points in a vertical direction, and k sample points in the longitudinal direction are set respectively. The correction patterns (the first pattern and the second pattern) for each sample point are created according to the distortion which is measured in advance with respect to windshield glass 201 (or a car type). Pattern storage unit 151 stores these correction patterns.

First reader 152 reads a first pattern corresponding to a coordinate of the left eye (Lx, Ly, Lz) which is detected by detector 140 from pattern storage unit 151 and outputs the read pattern to corrector 120. Here, pattern storage unit 151 reads a first pattern of the sample point adjacent to the coordinate of the left eye (Lx, Ly, Lz). However, if the coordinate of the left eye which is detected by detector 140 is same as the last time, first reader 152 does not read from pattern storage unit 151.

Second reader 153 reads a second pattern corresponding to a coordinate of the right eye (Rx, Ry, Rz) which is detected by detector 140 from pattern storage unit 151 and outputs the read pattern to corrector 120. Here, pattern storage unit 151 reads a second pattern of the sample point adjacent to the coordinate of the right eye (Rx, Ry, Rz). However, if the coordinate of the right eye which is detected by detector 140 is same as the last time, second reader 153 does not read from pattern storage unit 151.

Therefore, changing unit 150 outputs the correction pattern appropriate to the position after changing to corrector 120 for each time when a position of a left eye or a right eye is changed.

Each function of the block diagrams illustrated in FIGS. 2 to 4 is implemented by a micro computer and a memory which is provided in display device 100. The memory stores a program implementing each function and the micro computer executes the program. In addition, the memory here is configured by a DRAM, a SRAM, a ROM, a flash memory, or the like, and includes a main memory as a primary storage and an auxiliary memory as a secondary memory.

[Operation]

In Embodiment 1 configured in the above manner, the operation of display device 100 will be described.

Figure 5:
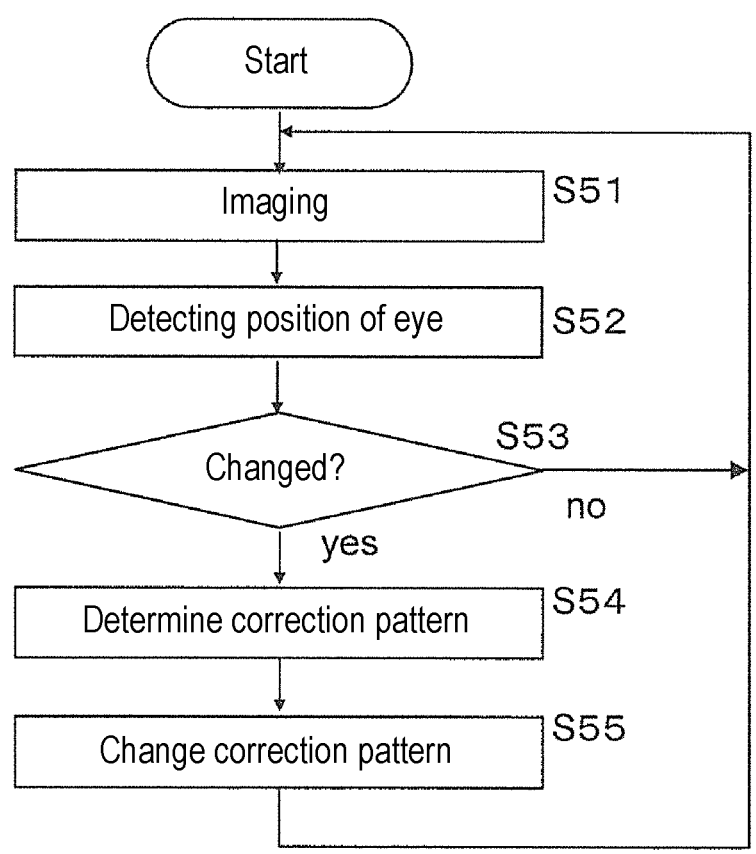
FIG. 5 is a flow chart illustrating an operation example of the display device in Embodiment 1.

FIG. 5 is a flow chart illustrating a correction operation example of the display device in Embodiment 1. In FIG. 5, acquisition unit 160 continuously outputs original image for left eye 33L and original image for right eye 33R for a navigation in accordance with a travelling of the vehicle as an image signal to corrector 120.

As illustrated in FIG. 5, camera 130 images the user (S51) and detector 140 detects the position of the left eye and the position of the right eye of the user from the imaged image (S52).

Changing unit 150 determines whether the position of the left eye or the position of the right eye detected by detector 140 is changed (S53) and returns to Step S51 in a case where it is determined that the position is not changed. In a case where the position is changed, changing unit 150 determines the correction pattern (the first pattern or the second pattern) corresponding to the changed position of the left eye or the changed position of the right eye (S54), and outputs the correction pattern to corrector 120, that is, changes the correction pattern in corrector 120 (S55).

The image in Step S51 may be an image as a still image or an image as a video image. In a case of the video image, for example, camera 130 images an image in a frame rate of about 30 frame/seconds, and detector 140 may detect the position of the left eye and the position of the right for each frame configuring the video image. In addition, in a case where the camera images an image as a still image, for setting an image period to a preferable period in FIG. 5, a standby time may be provided by a timer.

As described above, according to the display device according to Embodiment 1, the distortion of the image due to the windshield glass can be reduced. In addition, the distortions in the image for a left eye and the image for a right eye are respectively corrected, and the double images can be prevented. In this case, the correction pattern can be changed according to the actual positions of the eyes. That is, the distortions in accordance with the position of the user's eye can be appropriately corrected. In addition, the correction pattern with respect to a change in a position of the user's eye can be changed dynamically or in a real time. In addition, it is possible to correspond to a change in the position of the user's eye in the vertical direction, the horizontal direction, and the longitudinal direction.

(Embodiment 2)

Figure 6:
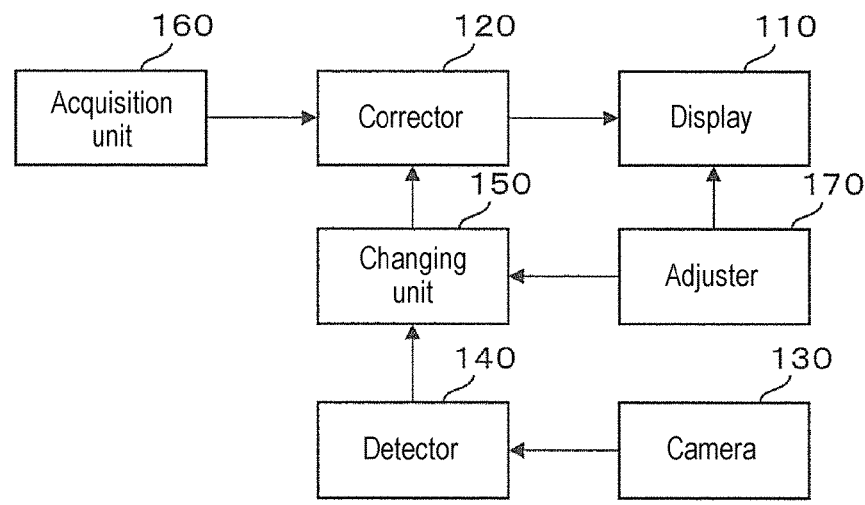
FIG. 6 is a block diagram illustrating a functional configuration example of a display device in Embodiment 2.

FIG. 6 is a block diagram illustrating a functional configuration example of display device 100 in Embodiment 2. The configuration illustrated in FIG. 6 is different from the configuration illustrated in FIG. 2 in that adjuster 170 is added in the configuration illustrated in FIG. 6. The different point will be mainly described below.

Adjuster 170 is a member for adjusting an inclination angle of display 110. A direction of adjustable inclination angle is at least an inclination of the display image in a vertical direction. In other words, adjuster 170 adjusts at least the inclination in which an axis parallel to windshield glass 201 is used as a rotation axis in a case where windshield glass 201 is regarded as a plane surface. This adjustment may be a manual adjustment by the user. That is, since seating heights (more specifically, a height of the eye) are different for each user, the lengths of the virtual image (or the aspect ratio of the virtual image) in the vertical direction is different depending on the inclination angle according to the height of the user's eye. The difference in the length of the virtual image depending on the inclination angle is a type of the distortions. Adjuster 170 optimizes (for example, maximizes) the distortion such as a distortion due to the inclination angle. In addition, changing unit 150 acquires angle information indicating the inclination angle from adjuster 170 and optimizes (for example, maximizes) an aspect ratio of the correction pattern according to the inclination angle.

In addition, adjuster 170 may adjust a position of display 110 in a z direction (longitudinal direction). In this case, the correction pattern is changed according to the position of display 110 in the z direction (longitudinal direction).

According to display device 100 according to Embodiment 2, regarding the height of the user's eye, that is, a seating height of the user, the distortion can be corrected in a wide range. In addition, regarding the height of the user's eye, that is, the seating height of the user, the aspect ratio of the image can be made appropriate.

MODIFICATION EXAMPLE 1

The curved shape of windshield glass 201 varies across the age. In the present modification example, display device 100 for correcting the distortion of the image due to changes across the age in the curved shape will be described.

Figure 7:
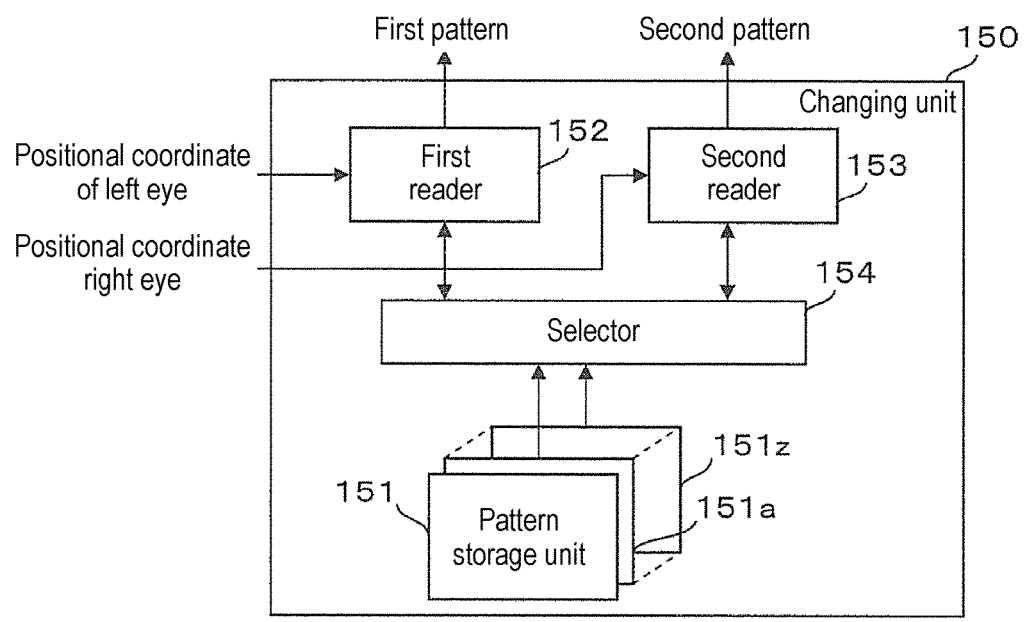
FIG. 7 is a block diagram illustrating a configuration example of a changing unit in a modification example.

FIG. 7 is a block diagram illustrating a configuration example of changing unit 150 in Modification Example 1. The configuration illustrated in FIG. 7 is different from the configuration illustrated in FIG. 4 in that a plurality of pattern storage units 151a to 151z are added in the configuration illustrated in FIG. 7. The difference features will be mainly described in below.

The plurality of pattern storage units 151a to 151z is configured in the same manner as that of pattern storage unit 151. However, the plurality of pattern storage units 151a to 151z stores the correction pattern in accordance with the changes across the age of windshield glass 201. For example, pattern storage units 151a, 151b, 151c, . . . correspond to the curved shape changed across the age of 1 year, 2 years, 3 years, . . . . Regarding the changes across the age of the curved shape, the changes may be obtained in advance by an acceleration test or a simulation in which the use environment of windshield glass 201 is simulated, a collection of durability data of windshield glass 201 in the past.

Selector 154 selects one pattern storage unit among pattern storage units 151 and 151a to 151z according to the age of use of windshield glass 201. Selected pattern storage unit 151 is a target to be read by first reader 152 and second reader 153. In addition, selector 154 may receive the age of use of windshield glass 201 (vehicle) from user.

By such a configuration, even in a case where the distortion type is changed by the changes across the age of windshield glass 201, display device 100 can correct the distortion appropriately.

Since the changes across the age of windshield glass 201 are different depending on the use environment of the vehicle, a use frequency, a travelling distance, or the like, selector 154 may perform the selection by the designation of the user.

MODIFICATION EXAMPLE 2

In each embodiment above, as illustrated in FIG. 4, a configuration example in which pattern storage unit 151 stores a correction pattern for each of a plurality of sample points for a positional coordinate to be obtained by the left eye and the right eye is described. In the present modification example, a configuration example in which pattern storage unit 151 stores correction amount data instead of the correction pattern and calculates the correction pattern from the correction amount data is described.

Figure 8:
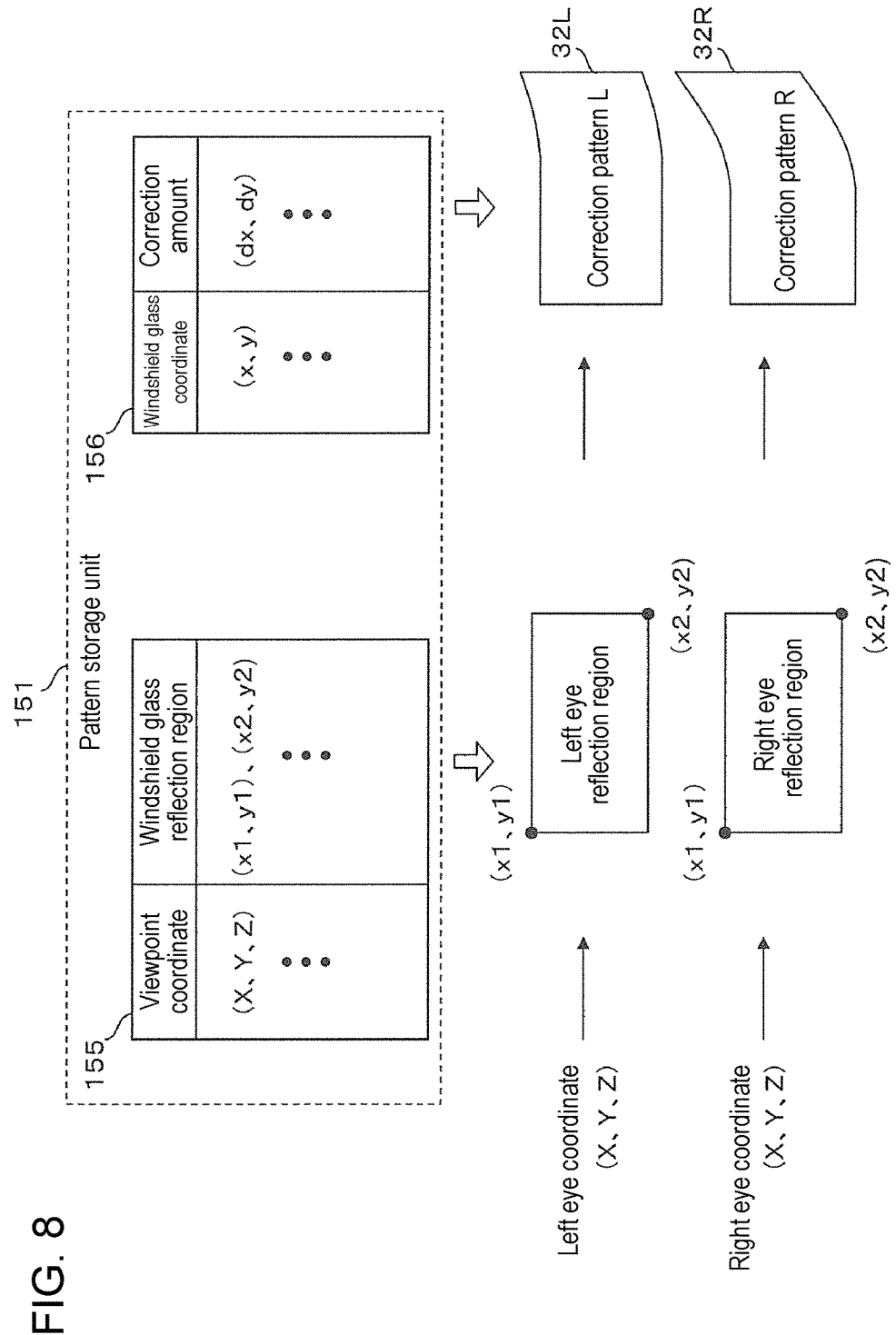
FIG. 8 is a block diagram illustrating a configuration example of a pattern storage unit in a modification example.

FIG. 8 is a block diagram illustrating a configuration example of pattern storage unit 151 in Modification Example 2. Pattern storage unit 151 includes reflection region table 155 and correction amount table 156.

Reflection region table 155 is a table for correlating viewpoint coordinates indicating a position of the left eye or a position of the right eye of the user and a reflection region indicating a region of a reflected image on the display surface of windshield glass 201 viewed from the viewpoint coordinate. The viewpoint coordinates (X, Y, Z) is a coordinate in a xyz coordinate system in the vehicle which is described in above. The reflection region on the windshield glass surface is represented by an upper left coordinates (x1, y1) and lower right coordinates (x2, y2) in a case where the reflection region is a rectangle as illustrated in FIG. 8. The coordinate system of the reflection region may be, for example, a coordinate system when regarding windshield glass 201 as a plane surface. In addition, the coordinate system of the reflection region may be a vertical plane coordinate system including any one of the reflection points of windshield glass 201. In addition, the coordinate system of the reflection region may be used as a plane coordinate system including virtual image VM1.

Therefore, if the viewpoint coordinate is determined, the reflection region is uniquely determined. Reflection region table 155 is created in advance according to the shape of windshield glass 201.

Correction amount table 156 is a table for correlating a coordinate (x, y) of windshield glass 201 and the correction amount (dx, dy) in the coordinate. The coordinate of windshield glass 201 is a coordinate in the coordinate system of the above-described reflection region. The correction amount (dx, dy) indicates a degree of shifting the pixel position of the corresponding coordinates in the x direction and the y direction.

When a left eye coordinate (X, Y, Z) to be input from detector 140 is changed, first reader 152 acquires the upper left coordinate (x1, y1) and the lower right coordinate (x2, y2) of the reflection region by referring to reflection region table 155. In addition, first reader 152 refers correction amount table 156 to calculate correction pattern 32L by adding the correction amount to the coordinate value for each coordinate in the reflection region. The region in which the correction amount is added indicates the shape of correction pattern 32L. First reader 152 changes the current correction pattern which is used by corrector 120 by correction pattern 32L calculated in the above manner.

When a left eye coordinate (X, Y, Z) to be input from detector 140 is changed, second reader 153 calculates correction pattern 32R in the same manner as that of the above.

In this manner, pattern storage unit 151 illustrated in FIG. 8 includes reflection region table 155 for storing the reflection region of windshield glass 201 corresponding to the viewpoint coordinate and correction amount table 156 indicating a correction amount for each coordinate of windshield glass 201. First reader 152 and second reader 153 calculate correction patterns 32L and 32R corresponding to the left eye coordinate and the right eye coordinate by referring to reflection region table 155 and correction amount table 156.

Therefore, the configuration example of pattern storage unit 151 in Modification Example 2 can save a storage capacity as compared with a configuration example of pattern storage unit 151 of FIG. 4.

In the above described example, an example in which a plurality of correction patterns or the correction amount table is held in pattern storage unit 151 is described. However, at least a part of the correction pattern or a correction amount table may generate by a calculation program according to the coordinate of the left eye (Lx, Ly, Lz), the coordinate of the right eye (Rx, Ry, Rz), or an angle or a position of display 110, and changes in the windshield glass due to the changes across the aging degradation, without all of the correction patterns or the correction amount tables are stored in pattern storage unit 151.

Each of the structural elements in each of the above-described embodiments may be configured in the form of an exclusive hardware product, or may be realized by executing a software program suitable for the structural elements. The constituent elements may be implemented by a program execution unit such as a CPU or a processor which reads and executes a software program recorded on a recording medium such as a hard disk or a semiconductor memory. A software program by which an image decoding device according to the above embodiment is implemented is as follows.

That is, the program is a program for causing the computer to execute the following display method. This display method is a display method in display device 100 for reflecting a display image for a naked eye three-dimensional display to a surface of windshield glass 201. The display method includes a step of correcting an image to be displayed on display 110 according to correction patterns 32L and 32R in accordance with the curved shape of windshield glass 201 and a step of displaying the corrected image. Here, the image to be displayed includes original image for left eye 33L and original image for right eye 33R. In addition, the correction pattern includes first pattern 32L for correcting original image for left eye 33L and second pattern 32R for correcting original image for right eye 33R.

In FIG. 8, pattern storage unit 151 may have a plurality of sets of reflection region table 155 and correction amount table 156. The plurality of sets corresponds to the changes across the age and may be set such that one set is selected by the age of use of windshield glass 201 or the user designation.

In each embodiment, an example in which display device 100 is mounted on a vehicle is described. However, display device 100 may be mounted on a bike, aircraft, ship or the like, and may be mounted on a tourist bus, a Ferris wheel, sea exploration ship, an attraction cart, or the like. In addition, display device 100 is not limited to a moving object such as a vehicle, may be mounted in a window frame other than the moving object, and may have a configuration in which the reflection is performed to a window glass having a curved surface.

In addition, in the embodiments, an example in which the windshield glass is a front glass is described. However, the windshield glass may be a side glass, a rear glass, and a ceiling glass. In addition, an example in which the reflection surface of the windshield glass is curved in a concave shape is described. However, the reflection surface may be curved in a convex shape.

In addition, display 110 is described in an example that the naked eye three-dimensional displayable display image is displayed. However, a configuration in which a three-dimensional displayable image is displayed by a polarization glass or a shutter glass. The shutter glass is a glass by which the left eye and the right eye are alternately shielded from light with a liquid crystal plate or the like in synchronization with the display of the image for a right eye and the image for a left eye.

In addition, in each embodiment, an example in which display device 100 is mounted on a driver side of a driver seat is described. However, display device 100 may be mounted by a passenger's side. In addition, display device 100 may use a passenger on a backseat as a user.

Although the embodiments are described above, the claims in this application are not limited to these embodiments. Those skilled in the art would readily appreciate that, without departing from the novel teachings and advantages of the subject matter recited in the appended claims, various modifications may be made in the above-described embodiments and other embodiments may be obtained by arbitrarily combining structural elements in the above-described embodiments. Therefore, such modification examples and other embodiments are also included in the present disclosure.

As described above, the display device according to an aspect of the present disclosure includes a display and a corrector. The display reflects a display image for a naked eye three-dimensional display to a windshield glass. A corrector corrects an image to be displayed on the display according to a correction pattern in accordance with a curved shape of the windshield glass. The image to be displayed includes an image for a left eye and an image for a right eye, and the correction pattern includes a first pattern for correcting the image for a left eye and a second pattern for correcting the image for a right eye. Therefore, a distortion due to the windshield glass can be reduced. In addition, since each distortion in the image for a left eye and the image for a right eye is corrected, respectively, a cross talk can be reduced.

Here, the display device may further include a camera, a detector, and a changing unit. The camera images a user. The detector detects a position of a left eye and a position of a right eye of the user from an image imaged by the camera. The changing unit changes the first pattern and the second pattern in accordance with the position of the left eye and the position of the right eye. Therefore, the correction pattern can be changed according to a position of an actual eye. That is, the distortion in accordance with the position of the eyes of the user can be appropriately corrected.

In a case where the position of the left eye and the position of the right eye which are detected by the detector are changed, the changing unit may change the correction pattern. Therefore, in a case where the positions of the actual eyes are changed, the correction pattern can be changed. That is, the distortion due to a change in the positions of the eyes of the user can be changed.

The detector may detect detects the position of the left eye and the position of the right eye of the user for each frame by video imaging of the camera. Therefore, the correction pattern with respect to a change of the positions of the eyes of the user can be changed dynamically or in a real time.

The detector may detect a coordinate indicating the position of the left eye and the position of the right eye in a xyz coordinate system, and the changing unit may change the first pattern and the second pattern in accordance with the coordinate. Therefore, it can be possible to correspond to a change in the positions of the eyes of the user in a vertical direction, a horizontal direction, and a longitudinal direction.

The changing unit may store a correction pattern corresponding to a curved shape in accordance with a secular change of the windshield glass and change the correction pattern according to an age of use of the windshield glass. Therefore, even in a case where the distortion due to the secular change of the windshield glass is changed, the distortion can be appropriately corrected.

The display device may further include an adjuster for adjusting an inclination angle of the display. Therefore, for heights of the eyes of the user, that is, a sitting height of the user, the distortion can be corrected in a wider range.

The changing unit may further adjust the correction pattern so as to change an aspect ratio of the display image. Therefore, for heights of the eyes of the user, that is, a sitting height of the user, the aspect ratio of the image can made appropriate in a wider range.

In addition, a display method according to an aspect of the present disclosure is a display method for reflecting a display image for a naked eye three-dimensional display to a windshield glass. In the display method, firstly, an image to be displayed on the display is corrected according to a correction pattern in accordance with a curved shape of the windshield glass. The corrected image is displayed. The image to be displayed includes an image for a left eye and an image for a right eye, and the correction pattern includes a first pattern for correcting the image for a left eye and a second pattern for correcting the image for a right eye.

In addition, a program according to an aspect of the present disclosure causes a computer to execute the display method.

It is to be noted that these generic or specific aspects may be implemented using a system, a method, an integrated circuit, a computer program, or a non-transitory computer-readable recording medium such as a CD-ROM, and may also be implemented by any combination of systems, apparatuses, methods, integrated circuits, computer programs, or recording media.

The present disclosure is useable to the display device such as a head-up display for a vehicle.

The invention claimed is:

1. A display device comprising:
a display for reflecting a display image for a naked eye three-dimensional display to a windshield glass;
a camera for imaging a user;
a memory that stores instructions; and
a processor that, when executing the instructions stored in the memory, performs operations comprising:
  correcting the display image according to a correction pattern in accordance with a curved shape of the windshield glass, and
  displaying the corrected display image, wherein:
the corrected display image includes an image for a left eye and an image for a right eye,
the correction pattern includes a first pattern for correcting the image for a left eye and a second pattern for correcting the image for a right eye
the processor, when executing the instructions stored in the memory, further performs operations comprising:
  detecting a position of a left eye and a position of a right eye of the user from an image imaged by the camera; and
  changing the first pattern and the second pattern in accordance with the position of the left eye and the position of the right eye, respectively.

2. The display device of claim 1,
wherein the processor, when executing the instructions stored in the memory, further performs operations comprising:
detecting whether the position of the left eye or the position of the right eye are changed, and
changing the correction pattern.

3. The display device of claim 1,
wherein the processor, when executing the instructions stored in the memory, further performs operations comprising detecting the position of the left eye and the position of the right eye of the user for each frame obtained by video imaging of the camera.

4. The display device of claim 1,
wherein the processor, when executing the instructions stored in the memory, further performs operations comprising:
detecting a coordinate indicating the position of the left eye and the position of the right eye in a xyz coordinate system, and
changing the first pattern and the second pattern in accordance with the coordinate.

5. The display device of claim 1,
wherein the processor, when executing the instructions stored in the memory, further performs operations comprising
storing a correction pattern corresponding to a curved shape that is in accordance with a secular change of the windshield glass, and
changing the correction pattern according to an age of use of the windshield glass.

6. The display device of claim 1,
wherein the processor, when executing the instructions stored in the memory, further performs operations comprising adjusting the correction pattern so as to change an aspect ratio of the display image.

7. A display method for reflecting a display image for naked eye three-dimensional display to a windshield glass, the method comprising:
correcting the display image according to a correction pattern that is in accordance with a curved shape of the windshield glass;
displaying the corrected display image, wherein:
  the corrected display image includes an image for a left eye and an image for a right eye, and
  the correction pattern includes a first pattern for correcting the image for a left eye and a second pattern for correcting the image for a right eye;
detecting a position of the left eye and a position of the right eye of the user from an image imaged by a camera; and
changing the first pattern and the second pattern in accordance with the position of the left eye and the position of the right eye, respectively.

* * * * *